United States Patent [19]

Swidler et al.

[11] Patent Number: 4,598,302

[45] Date of Patent: Jul. 1, 1986

[54] TRANSFER TYPE RECORDING APPARATUS

[75] Inventors: Ron Swidler, Palo Alto; Dale Ploeger, Newark, both of Calif.

[73] Assignee: Kyocera Corporation, Japan

[21] Appl. No.: 747,063

[22] Filed: Jun. 20, 1985

[51] Int. Cl.[4] .......................... G01D 15/10; B41J 31/16

[52] U.S. Cl. ............................... 346/76 PH; 118/102; 400/198; 400/120; 427/141; 427/356

[58] Field of Search .......................... 346/76 PH, 140; 400/197, 198, 202.4, 120; 118/102, 103, 235; 427/141, 286, 356, 358

[56] References Cited

U.S. PATENT DOCUMENTS 3,719,261 3/1973 Heinzer ...................... 346/76 PH X
4,042,092 8/1977 Newman ......................... 427/141 X
4,128,348 12/1978 Steele ................................. 400/198
4,359,748 11/1982 Pasini ............................. 346/76 PH

*Primary Examiner*—Joseph W. Hartary
*Attorney, Agent, or Firm*—Spensley Horn Jubas & Lubitz

[57] ABSTRACT

Disclosed is a transfer type recording apparatus wherein after transferring-material borne on a support is transferred onto a recording medium by a transfer forcing means, the support from which the transferring-material has been partially removed by printing is again coated with transferring-material. The apparatus includes transferring-material removing means for removing transferring-material applied to said support while maintaining said transferring-material molten, said transferring-material removing means removing transferring-materials applied to two side margins of said support, thereby forming regions on both sides of a transferring-material coated surface on said support which are not coated with transferring-material.

8 Claims, 8 Drawing Figures

TRANSFER TYPE RECORDING APPARATUS

BACKGROUND OF THE INVENTION

This invention relates to a transfer type recording apparatus in which transferring material borne on a support is transferred onto a recording medium, by transfer forcing means, such as heat generating resistance elements or a laser source, thus recording desired information thereon. More particularly, the invention relates to a transfer type recording apparatus in which a transferring-material borne on a support from which the transferring-material has been partially removed by printing, is coated with transferring-material again, so that the support is repeatedly used.

A thermal transfer type recording device is well known in the art. In such devices, heat generating resistance elements arranged behind a film-like support (bearing the ink which can be molten by heat), selectively generate heat to transfer desired characters or pictures onto a recording sheet. In one example of the conventional recording device of this type, a transferring-material applying device for coating a transferring-material bearing support, with transferring-material thereon, is disposed downstream of the transferring position, to coat with transferring-material the support from which the transferring-material has been partially removed during printing, thereby to repeatedly use the support (cf. Japanese Patent Application Laid-Open No. 178885/1982).

One example of the above-described apparatus will be described with reference to FIGS. 6A and 6B. In these figures, reference numeral 1 designates a correcting roller on which a wire 1*a* is closely wound. An ink roller 2 is abutted against the outerwall (formed with the wire 1*a*) of the correcting roller 1 in such a manner that it rotates with the roller 1. An ink pool 3 is provided upstream of the position where the roller 2 abuts against the roller 1. The ink which is solidified at room temperature and molten by heat from the correcting roller 1 is stored in the ink pool 3.

Flanges 4 are provided on both ends of the correcting roller 1 in such a manner that the inner surfaces of the flanges 4 are in contact with the two ends of the correcting roller 1, whereby the ink pool 3 is sealed and the leakage of ink to the shaft of the ink roller 2 during an inking operation is prevented.

In the recording apparatus thus constructed, the thermal head 5 is selectively heated, so that an ink layer formed on the outer wall of the ink roller is thermally molten into a series of dots through a recording sheet 6 and predetermined data is thus printed on the recording sheet 6. The ink roller (the ink layer of which has been partially removed during the printing operation) is coated with the ink which is thermally molten by the correcting roller 1, while being rotated in the direction of the arrow. At the same time, the ink layer thus formed on the ink roller is regulated in thickness, and is dried before it reaches the transfer position, so that it can be used again.

In the conventional apparatus, the ink layer formed on the ink roller 2 is selectively heated through the recording sheet 6. Therefore, the transfer efficiency varies according to the thickness and the thermal conductivity of the recording sheet 6 employed. As a result, it is sometimes difficult to clearly record the data on the recording sheet.

This difficulty may be eliminated by employing the following method: A film-shaped ink sheet is employed as a member for bearing the ink layer, and a thermal head is arranged behind the ink sheet, so that the ink sheet is heated directly (without interposing the recording sheet) thereby to transfer the thermally molten ink, in the form of a series of dots, onto the recording sheet. According to the method, the transferring operation can be effectively achieved irrespective of the thickness and the thermal conductivity of the recording sheet.

However, using an ink sheet which is thin and flexible presents certain difficulties. Even if members for preventing the leakage of ink, such as flanges, are provided on both sides of the ink sheet, the ink sheet may vibrate in the widthwise direction to move away from the flange surfaces That is, it is difficult to completely prevent the leakage of ink. In addition, the sheet may be creased or twisted. Thus, the use of the ink leakage prevention members is not practical.

If leakage of ink occurs, the ink flows over to the opposite side of the ink sheet or is pooled at both ends of the ink sheet. As a result, in the transferring operation, the ink layer becomes non-uniform in thickness, thus causing irregular transfer or smudging of the heat generating resistance elements. Thus, even if a transfer type recording apparatus is manufactured by using such an ink sheet, the above-described difficulties accompanying the conventional apparatus cannot be eliminated.

SUMMARY OF THE INVENTION

Accordingly, an object of this invention is to provide a transfer type recording apparatus in which, whether its ink bearing support is an ink sheet or an ink roller, a transferring-material layer is formed which is uniform in thickness.

Another object of the invention is to provide a transfer type recording apparatus in which, when its ink bearing support is an ink sheet, a transferring-material layer formed on the ink sheet is uniform in thickness and will not spread to both ends of the ink sheet, so that it can be regulated to have a predetermined width at all times.

A further object of the invention is to provide a transfer type recording apparatus in which, when its ink bearing support is an ink sheet, the ink sheet will not be creased or twisted, and a thin ink bearing support can be used.

The foregoing objects and other objects of the invention have been achieved by a transfer type recording apparatus in which, after transferring-material (borne on a support) is transferred onto a recording medium by transfer forcing means, the support from which the transferring-material has been partially removed during printing is coated with transferring-material again. The recording apparatus comprises: transferring-material removing means for removing transferring-material applied to the support while maintaining the transferring-material molten, the transferring-material removing means removing transferring-material applied to two side margins of the support, to form transferring-material non-coated regions on both sides of a transferring-material coated surface on the support.

The nature, principle and utility of the invention will become more apparent from the following detailed description and the appended claims when read in conjunction with the accompanying drawings.

DETAILED DESCRIPTION OF THE INVENTION

Figure 2:
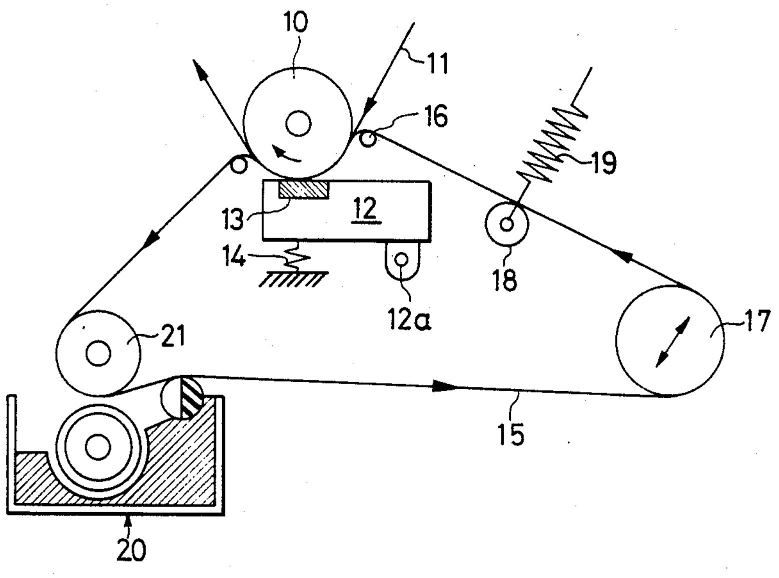
FIG. 2 is an explanatory diagram outlining the arrangement of the recording apparatus according to the invention.

FIG. 2 is an explanatory diagram showing the entire arrangement of a thermal transfer type recording apparatus according to this invention.

In FIG. 2, reference numeral 10 designates a platen on which a recording sheet 11 is placed. A pulse motor (not shown) drives the platen 10 to move the recording sheet intermittently, one line dot pitch at a time, in the direction of the arrow.

Further, in FIG. 2 reference numeral 12 designates a line head having a heat generating resistance element array 13 which faces the platen 10. The line head 12, which is pivotally joined to the frame of the machine by means of pivot 12*a*, pushes an ink sheet 15 and the recording sheet 11 against the platen 10 with the aid of a spring provided on the rear side of the line head, so that, whenever a line is dot-printed, the ink sheet is intermittently moved, following the recording sheet, by the frictional force between the ink sheet and the recording sheet.

The ink sheet 15 is an endless belt made of heat resisting resin film, e.g., a polyimide resin film. In order to obtain an excellent transfer efficiency, it is preferable that the ink sheet be about 10 m thick.

The ink sheet 15 is laid over a pair of shafts 16 disposed near the platen 10, a detour roller 21 forming a part of an ink applying device 20 (described later), a skew correcting roller 17 which swings in the directions of the two-head arrow, and a tension roller 18 pulled by a spring 19, so that a printing operation (described below) is repeatedly carried out.

As the ink sheet 15 is pushed by the recording sheet 11 against the platen 10, when the heat generating resistance elements 13 selectively generate heat, the ink borne on the ink sheet is transferred onto the recording sheet 11.

At the same time, the ink sheet 15, being pushed against the recording sheet 11, is intermittently moved following the recording sheet with the aid of the frictional force therebetween.

Therefore, that part of the ink sheet from which the ink layer is partially removed in the ink transferring operation described above, is delivered to the ink applying device 20. Device 20 is located downstream of the transfer position, and acts to again uniformly coat the ink sheet with ink. Thereafter, the skew of the ink sheet is corrected by the skew correcting roller 17, and then is returned to the predetermined position below the platen while being held under a certain tension by the tension roller. Thus, the ink sheet is again ready for the printing operation. The above-described operation is carried out cyclically.

Figure 1:
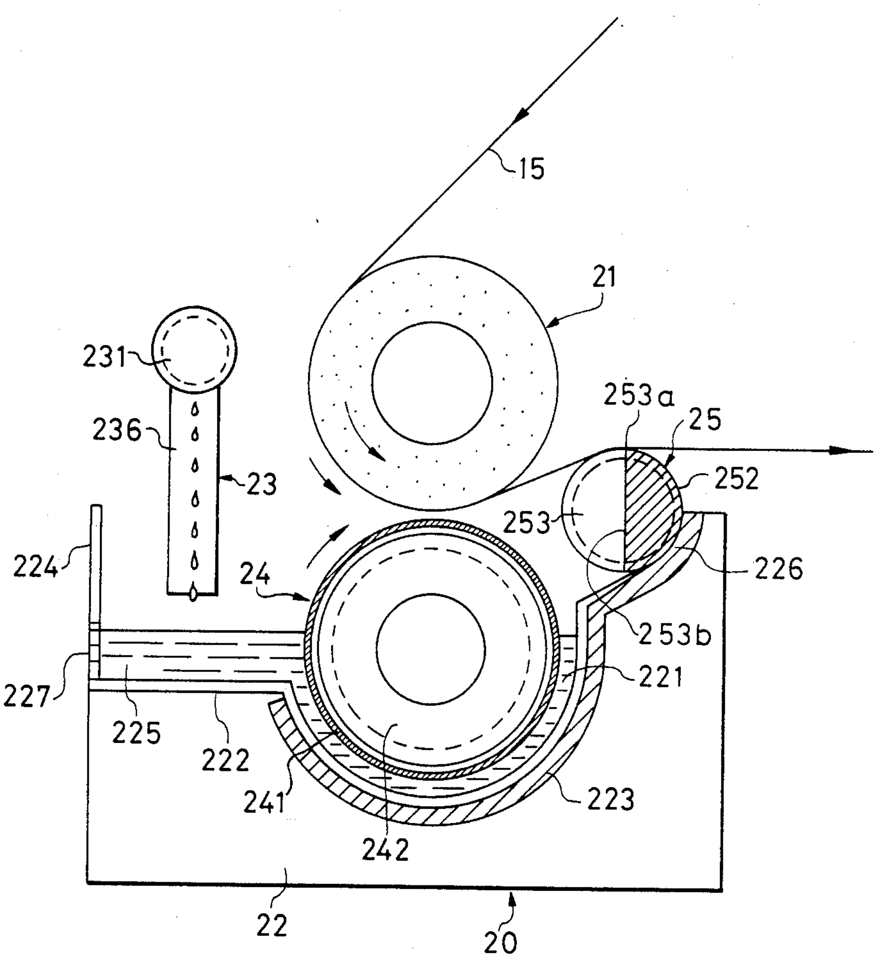
FIG. 1 is a sectional view showing an ink applying device which is an essential component of a transfer type recording apparatus according to this invention.

FIG. 1 shows the ink applying device 20 in more detail. The ink applying device 20 comprises: an ink tank 22 having an ink pooling section 221 which opens upwardly; an ink supplying unit 23 for suitably supplying ink to the ink pooling section 221; an ink supplying roller 24 arranged in the ink pooling section 221.

The afore-mentioned detour roller 21 is positioned above the ink supplying roller 24, with a small gap therebetween. A correcting rod 25 is disposed downstream of the rollers 21 and 24 in such a manner that it is in contact with the ink tank 22.

In the ink tank 22, a heat conducting plate 222 is provided on the side of the opening, and a heat generating plate 223 is provided underneath the heat conducting plate 222. Further, in the ink tank 22, the ink pooling section 221 (which is substantially semicircular in cross-section) is provided substantially at the center thereof. An ink introducing section 225, extending to an ink tank side wall 224, is provided on the inlet side (the left-hand side of FIG. 1) of the ink pooling section 221. A rod abutment 226 is formed on the outlet side of the ink pooling section 221 in such a manner that it is above the upper limit of the pooled ink level.

The heat generating plate 223 is made up of an insulator into which "Nichrome" wires or the like, are built. The plate 223 extends from the inlet to the rod abutment 226, in order to heat both the ink in the ink tank 22 and the correcting rod 25 abutted against the rod abutment 226. The heat conducting plate 222 is made of a material, for example a metal plate, with excellent thermal conduction capability. The plate 222 extends from the side wall 224 to the rod abutment 226, thus substantially covering the heat generating plate 223. Therefore, the heat conducting plate 222 can transmit the heat from the heat generating plate 223 to the ink in the ink introducing section 225 and to the ink pooling section 221.

The reason the heat generating plate 223 does not extend to the ink introducing section 225 is that such design prevents the heat of the heat generating plate 223 from causing a temperature sensor 227 (provided on the wall 224) to make measurement errors.

Figure 4:
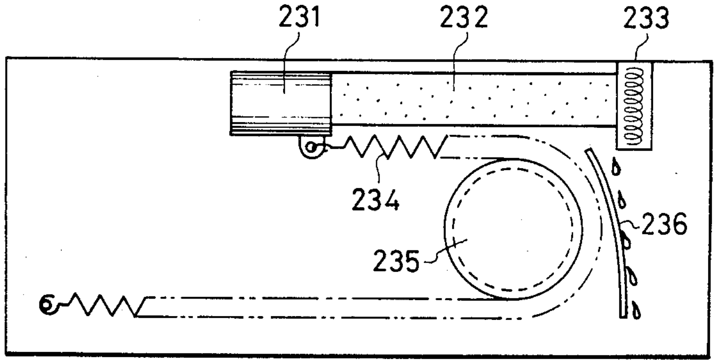
FIG. 4 is an explanatory diagram showing the arrangement of an ink supplying device in the ink applying device.

The ink supplying device 23 is provided above the ink introducing section 225. As shown in FIG. 4, ink supplying device 23 comprises: a disk-shaped heater 233 and a flowdown plate 236 provided below the heater 233; a cylindrical solid ink 232 which is molten at a temperature of about 70° C. or higher; and a pressure piece 231 provided at the rear end of the cylindrical solid ink 232 and having one end attached to a coil spring 234, which is laid over a detour pulley 235. In the ink supplying device, while the solid ink 232 is pushed against the heater 233 by the pressure piece 231, the solid ink 232 is melted by the heater 233. As the length of the solid ink is thusly contracted, the detour pulley 235 is turned to suitably correct the tensile force of the coil spring.

In the ink supplying device 23 thus constructed, when the level of the ink in the ink introducing section 225 becomes lower than the position of the temperature sensor 227 on the side wall 224 at the inlet of the ink introducing section, the ambient temperature of the sensor 227 is decreased. The sensor 227 detects this decrease, and turns on the heater 233. As a result, the solid ink 232 is melted. The molten ink drops down the flow-down plate 236 into the ink introducing section 225, thus supplementing the ink therein.

The temperature sensor 227 may be so designed as to control both the temperature of the heat generating plate 223 in the ink tank 22, and the temperature of a heat roll 242 (described later). A ring-shaped heat insulator may be provided around the temperature sensor 227 to eliminate external measurement error factors.

Figure 3:
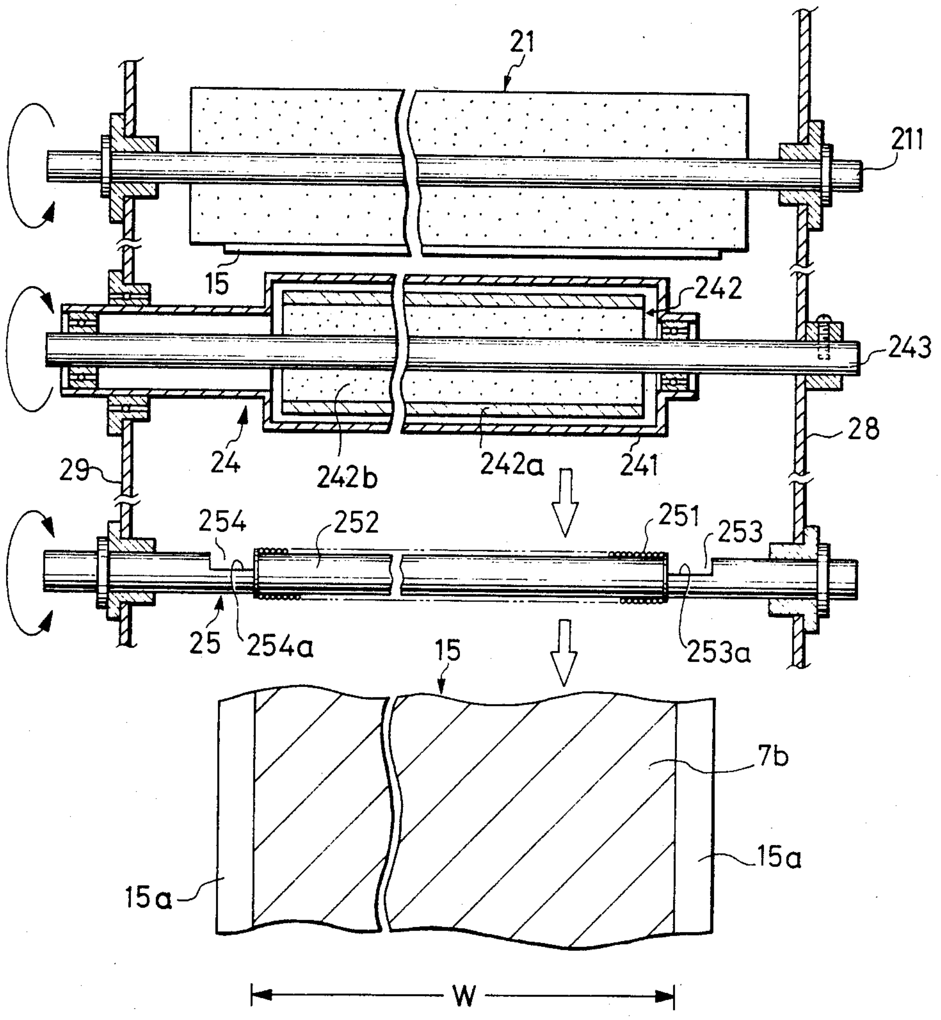
FIG. 3. is an explanatory diagram showing the arrangement of a detour roller, and ink supplying roller, and a correcting rod in an ink applying device in the recording apparatus of the invention.

The ink supplying roller 24 comprises: a cylindrical metal sleeve 241 which is arranged coaxial with the ink pooling section 221 and which, as shown in FIG. 3, has one end mounted rotatably on a shaft 243 fixedly secured to a side wall 28 and the other end rotatably supported on a side wall 29. The heat roll 242 is fixedly mounted on the shaft 243. Therefore, the heat roll 242 is coaxial with the sleeve 241 with a small gap therebetween.

The surface of the metal sleeve 241 is plated with chromium, so that the ink is readily transferred onto an ink sheet 15 (described later) by surface tension. The axial width of the metal sleeve 241 is slightly smaller than the ink coating width of the ink sheet 15 (cf. FIG. 3).

The heat roller 242 comprises a heat insulation roll body 242*b* of an insulating material, and a heater 242 wound on the roll body 242*a* having excellent heat retaining characteristics and providing uniform heat distribution. Therefore, the molten ink in the ink pooling section 221, while being maintained in the molten state, is uniformly applied to the outer wall of the metal sleeve 241 and is then delivered to a transfer position (described below).

The heat roll 242 is not rotated with the metal sleeve 241 in order to prevent the wear of heat generating contacts on its cylindrical surface. Even if the heat roll 242 is designed so as to rotate with the metal sleeve 241, the same effect can be obtained.

The provision of the small gap between the heat roll 242 and the metal sleeve 241 makes the heating temperature distribution on the metal sleeve 241 essentially uniform. Therefore, in view of the thermal expansion, etc., it is preferable that this small gap be of the order of about 0.5 mm.

The heating temperature on the surface of the metal sleeve, created by the heat generation of the heat roll 242, is determined according to the melting point and the required viscosity of the ink employed. If a solid ink 232 having a melting point of about 70° C. and a viscosity (suitable for the coating operation) of 5 to 20 cps is used, it is desirable that the heating temperature be controlled such that it ranges from 70° C. to 120° C.

The detour roller 21 is disposed above the ink supplying roller 24 with a predetermined distance therebetween.

The detour roller 21 is made of heat insulation resin, and is mounted on a rotary shaft 211, which is rotatably supported by the side walls 28 and 29, as shown in FIG. 3. The axial width of the detour roller 21 is larger than the width of the ink sheet 15.

The distance between the detour roller 21 and the ink supplying roller 24 is in the range of from 0.3 mm to 0.6 mm, so that the molten ink on the supplying roller 24 is readily and uniformly applied to the ink sheet by the surface tension.

Because the detour roller 21 is made of a heat insulation material (as described above), heat from the ink supplying roller 24 maintains the detour roller 21 at a temperature higher than the ink melting temperature. Therefore, the molten ink applied to the ink sheet 15 by the ink supplying roller 24 will not quickly cool. In addition, the detour roller 21 can slightly melt that part of the ink layer (on the ink sheet 15), which is partially removed during printing.

Accordingly, when the ink sheet 15 is coated with molten ink by the ink supplying roller 24, the molten ink thus applied becomes integral with the remaining ink layer on the ink sheet (which is also slightly molten, see above). As a result, a new ink layer, which is smooth and thick, is quickly formed on the ink sheet 15.

As was described before, the cylindrical correcting rod 25 is disposed downstream of the rollers 21 and 24. The correcting rod 25 is so arranged that its lower side is in contact with the heat generating plate 223 of the ink tank and its upper side, which is in contact with the ink sheet 15, is above the level of the gap between the rollers 21 and 24.

As shown in FIG. 3, the correcting rod is supported by the two side walls 28 and 29 in such a manner that it is rotatable through a predetermined angle about its axis. A thin chromium-plated wire 251 is closely wound on the correcting rod 25 over the length which corresponds to the desired ink coating width W of the ink sheet 15. An alternate construction could consist of fine threads cut onto the surface of same width W.

Figure 5A:
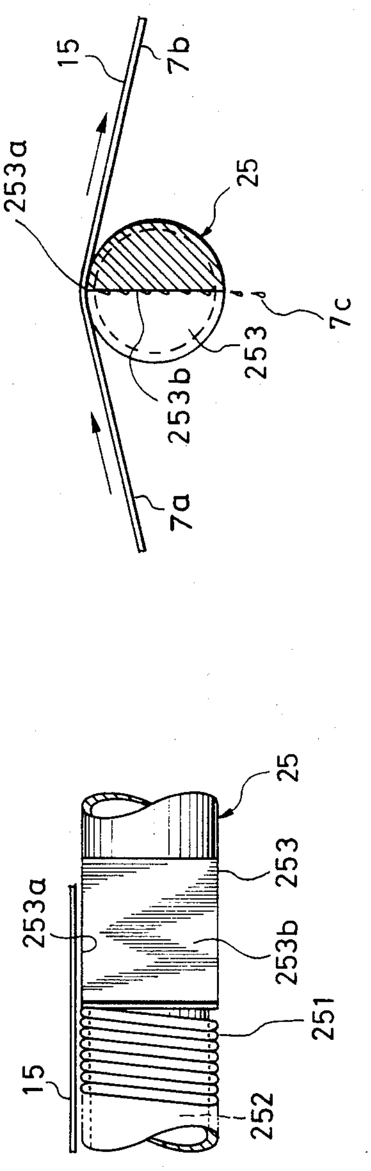
FIGS. 5A and 5B are explanatory diagrams for a description of the operation of the correcting rod.
Figure 5B:
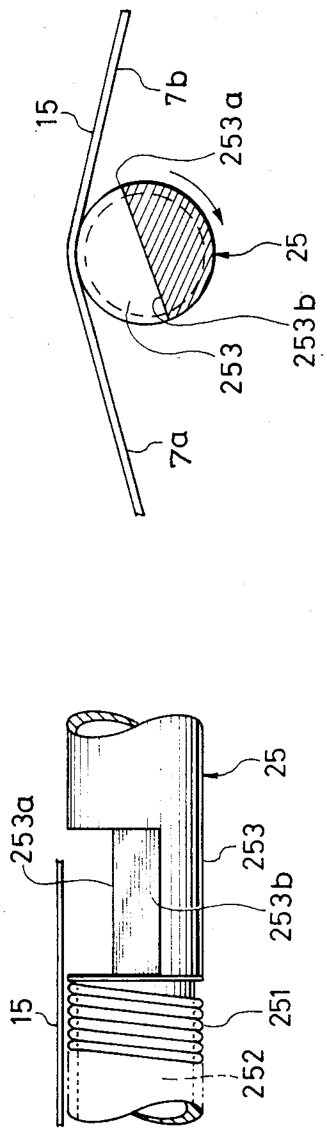
Figure 6A:
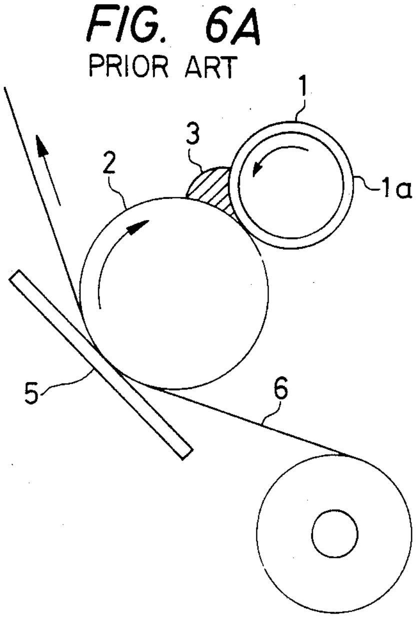
FIG. 6A PRIOR ART
FIGS. 6A and 6B are explanatory diagrams for a description of a conventional thermal transfer type recording apparatus.
Figure 6B:
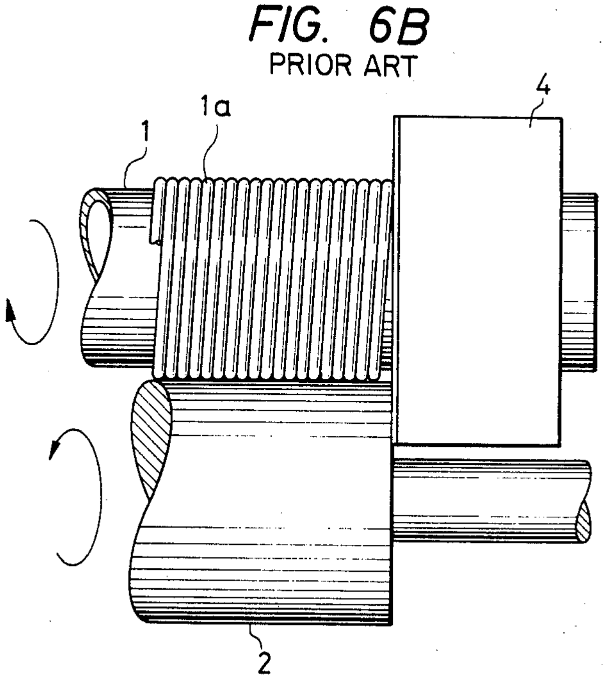
FIG. 6B PRIOR ART

The correcting rod 25 has wide slots cut about halfway through the rod, 253 and 254 on both sides of the wire wound part 252 thereof. These cuts result in a D-shaped cross section as shown in FIGS. 5A and 5B. The cuts 253 and 254 have edge surfaces 253*a* and 254*a* in such a manner that the respective edge surfaces 253*a* and 254*a* can be brought into contact with the two side margins 15*a* of the ink sheet 15.

It is not always necessary that the cuts 253 and 254 be D-shaped. For instance, the cuts may be triangular or rectangular, formed in the circular dimension of the correcting rod 25, and with the edge surface at the corner of the triangle or rectangle.

The operation of the correcting rod 25 will be described with reference to FIGS. 5A and 5B.

FIG. 5A shows a state of the recording apparatus in which a transferring operation is carried out and the ink sheet 15 is intermittently moved. In this operation, the correcting rod 25 is turned so that the edge surface 253*a* and 254*a* of the semicircular cuts 253 and 254 abut against the ink sheet 15.

Under this condition, the transferring operation is started. When the ink layer 7*a*, formed on the ink sheet 15 between the rollers 21 and 24 in such a manner that it is thick enough and has a width smaller than the predetermined coating width W, reaches the correcting rod 25, it is abutting against the wire-wound part 252 of the correcting rod 25. As a result, while the excess ink is being scraped off to the upstream side of the correcting rod 25, only the ink held in the gaps of the wire 251 is delivered to the downstream side of the wire-wound part 252. On this downstream side, the molten ink layer 7*b* is smoothed by the surface tension and is solidified before it arrives at skew correcting roller 17.

The correcting rod 25 is heated to a temperature higher than the ink melting temperature by the heat generating plate. Therefore, although the wire-wound part 252 is brought into contact with the ink sheet 15, the ink layer 7*a* will not solidify. Accordingly, the thickness of the ink layer can be controlled while keeping the ink layer molten.

As the wire-wound part 252 contacts the ink sheet 15, the ink layer 7*a* may spread from the wire-wound part 252 over to the two side margins of the ink sheet 15. The ink layers 7*a* formed on the two side margins of the ink sheet 15 are scraped off by the edge surfaces 253*a* and 254*a* of the D-shaped cuts 253 and 254. The ink layers thus scraped off, i.e., the molten ink 7*c*, flows down the cut surfaces 253*b* and 254*b* and the heat conducting plate 222 to return into the ink pooling section.

As is apparent from the above description, no ink layers are formed on both sides of the ink layer 7*b* on the ink sheet 15, namely, on the two side margins of the ink sheet 15. The ink layer 7*b* thus has the predetermined ink coating width W. Accordingly, the difficulty of an excessive amount of ink flowing over to the rear side of the ink sheet is eliminated. Ink spots formed on the two side margins 15*a* of the ink sheet 15 are also scraped off, and therefore the ink layer 7*b* formed is smooth and uniform in thickness.

The thickness of the ink layer 7*b* can be changed by selecting the diameter of the wire 251. It is preferable that the thickness of the ink layer 7*b* is of the order of 4 to 6 μm.

When the transferring operation is finished and the ink sheet 15 is stopped, the correcting rod 25 is turned through about 90° as shown in FIG. 5B. As a result, the edge surfaces 253*a* and 254*a* of the semicircular cuts 253 and 254 are moved away from the ink sheet 15. This operation completely prevents the molten ink spreading out of the wire-wound part 252 through the edge surfaces 253*a* and 254*a*, while the ink sheet is stopped.

Even when the ink sheet 15 is stopped, the wire-wound part 252 is maintained in abutting contact with the ink sheet. Therefore, the ink layer 7*a* is maintained in a molten state which can prevent the ink layer 7*b* from becoming of non-uniform thickness during the initial period of the transferring operation.

The above-described operations are repeatedly carried out to repeatedly coat the ink sheet 15 with the molten ink.

The construction and the operation of the transfer type recording apparatus should be clear from the above descriptions of the components and apparatus. However, to make sure, the sequence of the above-described operation will be briefly described as it occurs.

During transferring, the ink sheet 15 is intermittently moved to the detour roller 21. The detour roller 21 is heated to a temperature which is substantially equal to the ink melting temperature. Therefore, while the remaining ink layer on the ink sheet is still slightly molten, the ink sheet reaches the position where it is adjacent to the ink supplying roller 24.

At the adjacent position, the ink sheet faces the molten ink layer carried by the ink supplying roller 24, and the ink layer is transferred onto the ink sheet by the surface tension, thereby joining the remaining ink layer on the ink sheet. As a result, a smooth and thick ink layer 7*a* is formed. Since the ink supplying roller 24 is spaced from the ink sheet 15, the ink will not spread sideways. Therefore, the width of the ink layer 7*a* thus formed is equal to the total width of the ink supplying roller 24.

While still molten, the ink layer 7*a* formed on the ink sheet 15 is then brought into contact with the correcting rod 25. That is, it is pushed against the wire-wound part 252 of the correcting rod 25 so that the excess ink is scraped off to the upstream side, and the thickness of the ink layer is controlled while it is being spread sideways. The ink 7*c*, which has spread over to the two side margins of the ink sheet from the wire-wound part 252, is scraped off by the edge surfaces 253*a* and 254*a*, thus flowing down the heat conducting plate 222 into the ink pooling section 221. As a result, an ink layer 7*b* having the predetermined width is formed.

The ink layer 7*b* is smoothed by the surface tension on the side downstream of the correcting rod 25. The ink layer 7*b* thus smoothed is solidified before it reaches the skew correcting roller 17, so as to be again ready for transferring.

As is apparent from the above description, the transfer type recording apparatus of the invention is so designed that transferring-material removing means removes transferring-material applied to the side margins of an ink bearing support, the means being provided on both sides of a transferring-material coated surface on the support, so that transferring-material non-coated regions are provided on both sides of the transferring-material coated surface. Accordingly, whether an ink sheet or an ink roller is employed as the ink bearing support, ink leaks to both edges of the support are prevented. In addition, transferring-material layers formed on the side margins of the support are also positively removed. Therefore, a transferring-material layer, which is smooth and uniform in thickness and having a predetermined width, is formed on the support.

Furthermore, where an ink sheet is the ink bearing support, the ink sheet is prevented from being creased or twisted when used according to the invention. In the present shafts or crowned rollers 16, (roller which are tapered slightly larger in the center and toward each end) are placed in various positions throughout the path of the ink sheet. These rollers act to spread the sheet perpendicular to the path of travel and thus prevent creasing or twisting. In the recording apparatus of the invention, a thin ink bearing support can be used, and the transfer efficiency is improved. In addition, the apparatus can operate at high speed.

The terms used above are descriptive only and not terms of limitation. Accordingly, other modifications and variations are possible; thus, the invention is limited only by the scope of the claims which follows as well as all equivalents of the elements set forth herein.

What is claimed is:

1. A transfer type recording apparatus in which, after transferring-material borne on a support is transferred onto a recording medium by transfer forcing means, the support from which the transferring material has been partially removed by printing is coated with the transferring-material again, the apparatus comprising: transferring-material removing means for removing transferring-material applied to said support while maintaining said transferring-material molten, said transferring-material removing means removing transferring-materials applied to two side margins of said support, thereby forming regions on both sides of a transferring-material coated surface on said support which are not coated with transferring-material.

2. An apparatus as claimed in claim 1, in which said transferring-material removing means is brought into contact with said support to scrape off said transferring-material.

3. An apparatus as claimed in claim 2, in which said transferring-material removing means is in contact with said support only during a transferring operation, and is set apart from said support when said transferring operation is suspended.

4. An apparatus as claimed in claim 2 or 3, in which transferring-material scraping means are provided on both sides of a layer thickness correcting member which is formed by arranging a number of thin grooves in a direction perpendicular to the direction of conveyance of said support, said transferring-material scraping means for scraping off said transferring-material.

5. An apparatus as claimed in claim 4, in which, with a layer thickness correcting surface of said layer thickness correcting member maintained abutted against said support, said transferring-material scraping means is capable of being brought into contact with said support or set apart from said support.

6. In a recording apparatus for transferring ink from an ink sheet which forms an endless moving belt to a recording medium, wherein the ink sheet is again coated with ink following the transferring step, comprising:

ink removal means for removing ink from both side margins of said ink sheet, and means for maintaining said ink in a molten state during said removing operation.

7. The recording apparatus of claim 6 wherein said ink removal means includes a scraping means located at either side margin of said ink sheet for contacting said side margins to thereby remove ink therefrom.

8. The recording apparatus of claim 6 wherein said scraping means can selectively be removed from abutting contact with said side margins.

* * * * *